June 13, 1961     H. WELKER ET AL     2,988,639
METHOD AND DEVICE FOR SENSING NEUTRONS
Filed March 6, 1957
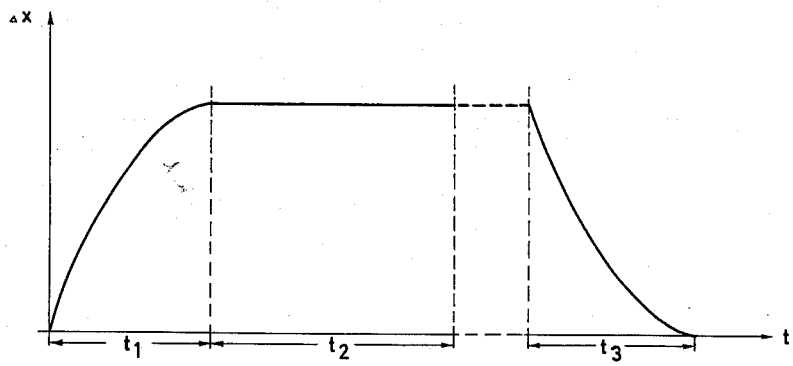
Fig. 1
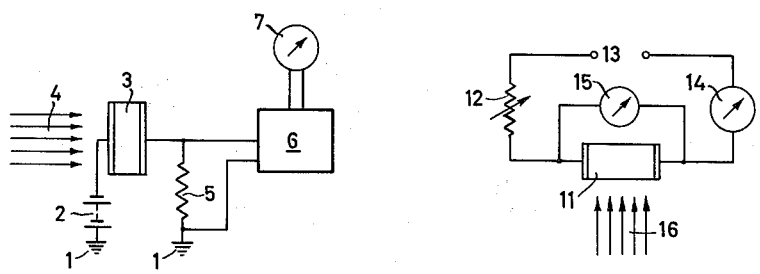
Fig. 2          Fig. 3
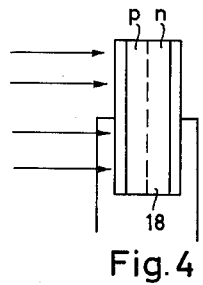     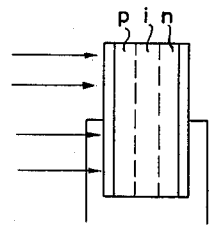
Fig. 4          Fig. 5

United States Patent Office 2,988,639
Patented June 13, 1961

2,988,639
METHOD AND DEVICE FOR SENSING NEUTRONS
Heinrich Welker and Rolf Gremmelmaier, Erlangen, Germany, assignors to Siemens-Schuckertwerke Aktiengesellschaft, Berlin-Siemensstadt, Germany, a corporation of Germany
Filed Mar. 6, 1957, Ser. No. 644,355
Claims priority, application Germany Mar. 9, 1956
10 Claims. (Cl. 250—83.1)

This invention relates to a method and device for the sensing of neutrons in accordance with semiconductor principles disclosed in our copending application Serial No. 569,997, filed March 7, 1956 issued as Patent No. 2,867,727 on January 6, 1959, and assigned to the assignee of the present invention.

According to the copending application the neutron detector comprises a semiconductor body formed of a binary compound of an element from the third group with an element of the fifth group of the periodic system and containing among its constituent elements either boron or nitrogen or both. The changes in electric properties of such a semiconductor compound, due to neutron-released nuclear reactions resulting in spontaneous emission of a charged particle, are utilized for detecting the neutrons, "spontaneous emission" being a reaction which causes emission of charged particles having an extremely short half-life such as below $10^{-4}$ seconds. As described in said copending application, the semiconductor body is subjected to the action of thermal or slow neutron radiation.

According to the present invention the semiconductor body of a neutron detecting device is formed of a semiconducting compound which comprises at least one component element that becomes radioactive under the influence of neutrons, and in which the instantaneous changes of the electric properties of the semiconductor body caused by the resulting radioactivity are utilized for sensing or measuring the neutron flow. "Instantaneous changes" are understood to mean those changes in properties, caused by radioactivity, that are produced by the electron-hole pairs generated in the semiconductor body by the radioactive radiation. Such chnages manifest themselves mainly by changes in electric conductivity.

In the main, therefore, the invention utilizes the effects of $\beta$- or $\gamma$-radiation as contrasted with utilization of those changes in electric semiconductor properties that, under the influence of neutron radiation, are due to nuclear transmutations which produce impurity centres, or due to collisions of fast neutrons with the atoms of the lattice which produce lattice defects. Such changes due to neutron-released nuclear transmutations and due to collisions, may be designated as "permanent." Among such permanent changes a distinction is to be made between "reversible" and "irreversible" changes as is explained in the above-mentioned copending application. Among the reversible permanent changes are the lattice defects (vacancies and interstitials) which are caused by neutrons but can be eliminated by heat treatment of the semiconductor body. Irreversible permanent changes result from the nuclear transmutations caused by the neutrons and the new impurity centres resulting from such transmutations. For obtaining well measurable permanent changes, relatively large integral flows of neutrons are necessary. Even with such large neutron intensities as occur, generally, only in nuclear reactors, long periods of neutron irradiation, for instance of several hours, are required.

It is therefore a more specific object of the present invention to afford an instantaneous detection of a neutron flow even when considerably smaller neutron densities are involved; and this is achieved, as mentioned, by employing a semiconductor compound having at least one component element or isotope that becomes radioactive when subjected to neutron radiation.

According to another feature, the essential component just mentioned is such that it becomes $\beta$-active, preferably with a half-life in the order of seconds. We have found that semiconducting compounds of indium, such as InP, are particularly well suitable as will be explained below.

The invention will be further explained with reference to the drawings in which:

FIG. 1 is an explanatory diagram illustrating the change in electric properties of the semiconductor body in a neutron sensing device according to the invention.

FIG. 2 is a schematic circuit diagram of an impulse measuring device according to the invention for the detection of weak neutron radiation.

FIG. 3 is a schematic circuit diagram of a device according to the invention for the detection of neutrons by response to the change in electric conductance of the semiconductor body.

FIG. 4 is a schematic diagram of a semiconductor body containing a p-n-junction; and FIG. 5 is a schematic diagram of a semiconductor p-i-n-device.

As mentioned, the radioactivation of at least one component of the semiconductor body occurring under the influence of neutron radiation causes an instantaneous change in the electric properties of the semiconductor body by the generation of electron-hole pairs. This instantaneous change has the result that, when the neutron radiation commences to be effective, the change in electric property, for instance electric conductivity, increases in accordance with an exponential law. This exponential increase, corresponding to the time characteristic of the radioactivity, is proportional to $1-e^{-\lambda t}$, wherein $t$ denotes the period of time and $\lambda$ the decay constant of the particular radioactivity. The exponentially ascending portion of the electric characteristic, which we call the "non-stationary" portion of the change in electric properties, is followed, after sufficient period of time $t$, by an approximately constant range of the changes in electric properties which we designate as the "stationary" portion. In accordance with the time curve of the electric changes when commencing the neutron flow, there also occurs a non-stationary portion of the change in electric properties when the neutron flow is discontinued, the latter portion being likewise dependent upon the time characteristic of the radioactivity and hence in accordance with an $e^{-\lambda t}$ law.

A typical curve of the changes in electric properties of the semiconductor body in a device according to the invention, for instance the change in conductance or the number of impulses per unit of time, is illustrated in FIG. 1. The abscissa indicates the time ($t$), and the ordinate indicates the magnitude ($\Delta X$) of the changes in electric properties of the semiconductor body. The periods $t_1$ and $t_3$ represent the above-defined non-stationary portions during switching-on and switching-off of the neutron radiation, and the period $t_2$ indicates the stationary portion of the characteristic.

Since in many cases there occur radioactivities of different decay constants, the increase and decay of the radioactivity and hence the changes in electric properties do not follow a single exponential law; but there results a superposition of exponential laws corresponding to respectively different decay constants. Their analysis can be carried out in the known manner by entering the measured changes versus time on a logarithmic scale.

Both instantaneous changes, that is the stationary and non-stationary portions, are utilized for neutron detection in a device according to the invention. The stationary changes are suitable particularly for sensing the intensity of a neutron radiation, and the non-stationary changes occurring when the neutron radiation commences or ceases are particularly applicable for determining the neutron components of mixed radiation, that is for the purpose of analyzing such radiation. The stationary changes are proportional to the neutron flow. Any fluctuations in electric properties of the semiconductor body as may be due to radiation background superimpose themselves upon the effect of the neutron flow. Both component effects can be separated by measuring the non-stationary changes since the latter are caused only by radioactivity due to flow of neutrons.

According to another embodiment of a device according to the invention, not only the instantaneous changes in electric properties but also the above-mentioned permanent electric changes in the semiconductor body are utilized, particularly for determining an integral neutron flow, that is a neutron flow integrated over a period of time.

As mentioned, the method and device according to the invention take advantage predominantly of $\beta$-activity. That is, the semiconductor bodies to be used have at least one component that, when exposed to neutrons, becomes $\beta$-active, preferably with a half-life in the order of seconds. The magnitude of the half-life period is a temporal measure for the non-stationary portion of the changes in electric properties of the semiconductor body. In general, it is desirable to attain saturation, i.e. to reach the stationary portion of the characteristic, within relatively short time, this being the reason why half-life periods in the order of seconds and less are given preference.

All above-mentioned desired properties are realized, for instance, by a semiconductor body formed of a semiconducting crystalline compound of which indium is a component, namely predominantly the isotope $In^{115}$. When such a compound is subjected to neutron radiation, the indium is converted according to the reaction $In^{115}$ $(n,\gamma)$ $In^{116}$ into $\beta$-active $In^{116}$ with a half-life of 13 seconds and an action cross section of 52 barn, or with a half-life of 54.3 minutes and an action cross section of 145 barn. Since the naturally occurring indium contains 95.8% $In^{115}$ and 4.2% $In^{113}$, there also occurs the following reaction: $In^{113}$ $(n,\gamma)$ $In^{114}$. $In^{114}$ is $\beta$-active and converts into $Sn^{114}$, this occurring with a half-life of 72 seconds with an action cross section of 2 barn. Because of these different possibilities of decay, a semiconductor body containing an indium component exhibits corresponding superpositions of non-stationary and stationary changes; but when the measuring period is relatively short, the radioactivity of 13 seconds half-life will predominantly manifest itself.

The $\beta$-rays emitted during decay of $In^{116}$ with an energy content of 2.9 or 1 m.e.v., produce electron-hole pairs within the semiconductor crystal. For each electron-hole pair, the $\beta$-particle loses energy in an order of magnitude of 10 e.v., so that a $\beta$-particle generates approximately $10^5$ electron-hole pairs. In order to have this effect produce an exteriorly measurable electric change in the semiconductor body, for instance a measurable change in conductance, it is necessary that the semiconductor body be sufficiently free of traps. Only then can the generated pairs of charge carriers flow through the crystal lattice and can thus augment the conductance of the semiconductor. This contribution to conductance is proportional to the lifetime of an electron-hole pair. Hence by modifying or adapting the lifetime and diffusion length of the electron-hole pairs in the semiconductor body, this body can be adapted within wide limits to the particular operating conditions desired.

To obtain ample effects, the semiconductor body must generally meet the requirement of being as high-ohmic as possible, having for instance a resistance of $10^6$ ohms, so that it will not conduct an appreciable "dark current," i.e. a flow of current at room temperature, which could aggravate the measuring conditions. This means that the semiconductor body must have a large width of the forbidden zone, for instance above 1 e.v. Semiconductors that do not meet these requirements can be used only for detecting the above-mentioned permanent changes. The term "forbidden zone" means the same as "energy gap" or "forbidden energy band," as defined in standard texts. Note the Shockley book Electrons and Holes in Semiconductors, 1950, Van Nostrand, pages 132–133.

The above-mentioned requirements can be satisfied more readily if, instead of a homogenous semiconductor crystal, a crystal with at least one large-area barrier layer is used, for instance a semiconductor body with p-n junctions.

Particularly suitable for use as semiconductor bodies in devices according to the invention are the semiconducting compounds InP and InN.

$\beta$-activity, in most cases, is accompanied by radiation which likewise generates electron-hole pairs in the semiconductor crystal. According to another feature of the invention, therefore, the semiconductor compound to be used in a neutron detecting device has at least one component that becomes $\gamma$-active with a large action cross section when subjected to the effect of neutron radiation. In this case, too, a half-life in the order of seconds or less is desirable generally. $\gamma$-activity is less favorable than $\beta$-activity. This is due to the fact that the $\beta$-particles are much more strongly absorbed in the semiconductor body than the $\gamma$-rays. Since further the neutrons in the suitable semiconductor bodies possess a small depth of penetration, for instance about 1 mm. for InP, thin crystals are usually sufficient. With such thin crystals, the effect of $\gamma$-radiation is relatively small because of slight absorption.

Since neutron radiation primarily is often accompanied by $\gamma$-radiation, it is also advantageous from this viewpoint to use thin semiconductor bodies, or semiconductor bodies with barrier layers, so dimensioned that the neutron radiation is absorbed as much as possible whereas the $\gamma$-radiation is permitted to virtually pass through without appreciable absorption. A "thin" semiconductor body for the just-mentioned purpose should be only as thick as approximately corresponds to the penetration depth of the neutrons, the median value of such depth being about 1 to 2 mm., as compared with the median penetrating depth of $\gamma$-rays which generally is between 1 and 10 cm. Hence, a semiconductor body of 1 to 2 mm. thickness satisfies the just-mentioned condition.

According to another feature of the invention, extremely slight neutron flows are preferably detected by utilizing the current-voltage impulses resulting from individual activation. For this purpose, a circuit connection can be used as shown in FIG. 2. The device is grounded at 1 and is energized from a voltage source 2 whose circuit comprises a semiconductor body 3 in series with a resistor 5. The semiconductor body 3, for instance of InP, consists of a flat crystalline plate of 1 to 2 mm. thickness and has a resistance in the order of $10^6$ ohms. This body is subjected to a flow of neutrons schematically represented by a group of arrows 4. Connected to the circuit is an amplifier 6 to which a measuring instrument 7 is connected. The radioactivation is caused by the neutrons that impinge upon and penetrate into the semiconductor body, and the resulting radioactive radiation generates electron-hole pairs in the semiconductor body. These abruptly change the electric conductance of the body 3 and thus produce voltage pulses which are amplified by the amplifier 6 and indicated by the instrument 7.

Also suitable for response to neutron flow and the utilization of resulting radioactivation of at least one component of the semiconductor compound, is an electric circuit as illustrated in FIG. 3. The semiconductor body 11 is connected in series with an adjustable resistor 12, a voltage source 13, and a current measuring instrument 14. A voltage measuring instrument 15 is connected across the semiconductor body 11. A flow of neutrons acting upon the semiconductor body 11 is represented schematically by a group of arrows 16. The changes in conductivity due to radioactivity are measured either in response to the voltage drop occurring across the semiconductor body 11 (measuring instrument 15), or by measuring in instrument 14 the increase in current flow. The conductance changes thus determined may also be applied to recording instruments, as is preferably done when determining the non-sationary portion of the characteristic.

By virtue of the $\beta$-, or $\beta$- and $\gamma$-, emission from the component radioactivated by the neutrons, the measurable electric effects in instruments exemplified by those described above commence virtually immediately in accordance with the typical characteristic shown in FIG. 1, and the devices are sensitive to smaller neutron intensities than needed for the semiconducting detector devices heretofore proposed.

The semiconductor compounds used in devices according to the invention may be doped with substitutional impurity atoms to obtain a desired type and degree of conductance as is generally known for semiconducting elements (Ge, Si) and semiconducting compounds. For instance, the above-mentioned indium compounds may be acceptor-doped with Zn, Cd, Hg for p-type conductance; or they may be donor-doped, for instance with S, Se, Te for n-type conductance. Suitable compounding, purifying and doping methods are known and proposed elsewhere. In this respect reference may be had, if desired, to the techniques described in U.S. Patent No. 2,798,989 of H. Welker (Serial No. 275,785, filed March 10, 1952); U.S. Patent No. 2,739,088 of W. A. Pfann; the copending application of H. Merkel, Serial No. 608,334, filed September 6, 1956 (F–1699, PA 55/1746); the copending application of O. G. Folberth, Serial No. 603,073, now Patent No. 2,944,975, filed August 9, 1956 (F–1695, PA 55/1728); or the copending application of R. Emeis, Serial No. 409,610, filed February 11, 1954 (F–1507, PA 53/1131). These applications are assigned to the same assignee as the instant applications.

The semiconductor bodies for use in devices according to the invention are preferably contacted by barrier-free electrode metals such as indium metal or gold which may be deposited by vaporization or by fusing them onto the semiconductor body.

Semiconductor bodies with intermediate layers or the above-mentioned barrier junctions are also applicable. Thus, FIG. 4 shows a semiconductor body 18, applicable in any of the above-described devices according to the invention, which comprises an acceptor-doped p-zone and a donor-doped n-zone to form a p-n junction. FIG. 5 illustrates an applicable semiconductor body which has a middle zone i of intrinsic conductance joined with two outer zones p, n doped for p-type and n-type conductance respectively, so that a p-i-n junction is formed. The conducatnce of such junction-type semiconductor bodies is asymmetrical but, by virtue of the artificially radioactivated component responds instantaneously to electron-hole pair generation by neutrons in the manner explained above.

When referring in the foregoing to detecting or sensing of neutrons, this is understood to comprise the detection of neutrons as well as the measuring of neutron energies, neutron intensities and combinations of these parameters, furthermore also the control and regulation of neutron flows (such as described in our above-mentioned copending application Serial No. 569,997, FIG. 6, now Patent No. 2,867,727) or of magnitudes that are images of such neutron flows, utilizing in each of these cases the variation in electric properties of the semiconductor body caused by the radioactivating effect of the neutrons upon at least one element that forms a component of the semiconductor compound.

We claim:

1. In combination with a source of neutrons, a neutron sensing device comprising a crystalline semiconductor body responsive to the flow of slow neutrons from said source when in operation and consisting essentially of a semiconductor compound containing as one of its constituents an element radioactive under the effect of the neutron flow, an electric circuit including said semiconductor body and having a current source connected with said body, and output means connected with said circuit, said semiconductor body forming, during sensing operation of the device, a condition-responsively variable component of said circuit so that said output means responds to instantaneous electric parameter change caused in said body by radioactivity due to the flow of neutrons.

2. In combination with a source of neutrons, a neutron sensing device comprising a high-ohmic resistor body of a crystalline semiconductor compound responsive to the flow of slow neutrons from said source and containing a constituent element which is $\beta$-active under the effect of the neutron flow, said body having a thickness approximately equal to the median depth of neutron penetration, an electric circuit including said semiconductor body and having a current source connected with said body, and output means connected with said circuit, said semiconductor body forming, during sensing operation of the device, a condition-responsively variable component of said circuit so that said output means responds to instantaneous electric parameter change caused in said body by radioactivity due to the flow of neutrons.

3. In a neutron sensing device according to claim 2, said neutron-responsively radioactive element of said semiconductor compound being indium predominantly in the form $In^{115}$, and said body of compound having a thickness of approximately 1 to 2 mm. and a minimum resistance in the order of $10^6$ ohms.

4. In a neutron sensing device according to claim 2, said compound being indium phosphide (InP) and said body having a thickness approximately equal to the median depth of neutron penetration so as to be absorptive to neutrons but substantially permeable to $\gamma$-radiation.

5. The method of sensing neutrons, which comprises subjecting to a flow of slow neutrons a semiconductor body formed of a compound containing at least one constituent element which becomes radioactive under the effect of the neutrons; and measuring an instantaneous electric parameter change caused in said body by the radioactive radiation, the semiconductor having a forbidden zone width above one electron volt, said constituent element being indium predominantly comprising $In^{115}$, the time period of the said measuring and of said subjecting being limited to that at which a radioactivity of 13 seconds half-life, of the resultant beta-active $In^{116}$, predominantly manifests itself.

6. A sensing device according to claim 1, said semiconductor body comprising indium phosphide (InP).

7. A sensing device according to claim 1, said semiconductor body comprising indium nitride (InN).

8. A sensing device according to claim 1, said element of the semiconductor compound being $In^{115}$.

9. A sensing device according to claim 2, said element being $In^{115}$.

10. The sensing device defined in claim 1, the semiconductor body having a resistance of at least $10^6$ ohms and having a forbidden zone of at least one electron volt.

References Cited in the file of this patent

UNITED STATES PATENTS

| | | |
|---|---|---|
| 2,564,626 | MacMahon et al. | Aug. 14, 1951 |
| 2,753,462 | Mayer et al. | July 3, 1956 |
| 2,847,585 | Christian | Aug. 12, 1958 |

OTHER REFERENCES

Neturon Irradiated Semiconductors; Physical Review, vol. 76, Aug. 1, 1949, page 442.

Slow-Neutron Detection by Foils, Title; Neucleonics, vol. 8, No. 6, July 1951, pages 5–9.

Cleland et al.: Physical Review, vol. 95, No. 5, Sept. 1, 1954, pages 1177–1182.